US009855494B2

(12) United States Patent
Lavery et al.

(10) Patent No.: US 9,855,494 B2
(45) Date of Patent: Jan. 2, 2018

(54) SYSTEMS AND METHODS FOR PROVIDING EFFICIENT GAME ACCESS

(71) Applicant: Zynga Inc., San Francisco, CA (US)

(72) Inventors: Samuel Lavery, Orinda, CA (US); Rahul Kapur, Albany, CA (US); Mohan Reddy, Fremont, CA (US); Scott D. MacGregor, San Francisco, CA (US); Jeffrey Zakrzewski, Toronto (CA)

(73) Assignee: Zynga Inc., San Francisco, CA (US)

( * ) Notice: Subject to any disclaimer, the term of this patent is extended or adjusted under 35 U.S.C. 154(b) by 456 days.

(21) Appl. No.: 14/676,286

(22) Filed: Apr. 1, 2015

(65) Prior Publication Data
US 2015/0273339 A1    Oct. 1, 2015

Related U.S. Application Data

(60) Provisional application No. 61/973,569, filed on Apr. 1, 2014.

(51) Int. Cl.
*A63F 9/24*         (2006.01)
*A63F 13/00*        (2014.01)

(52) U.S. Cl.
CPC ........ *A63F 13/00* (2013.01); *A63F 2300/201* (2013.01); *A63F 2300/407* (2013.01); *A63F 2300/532* (2013.01); *A63F 2300/535* (2013.01); *A63F 2300/5533* (2013.01); *A63F 2300/5546* (2013.01); *A63F 2300/5586* (2013.01)

(58) Field of Classification Search
None
See application file for complete search history.

(56) References Cited

U.S. PATENT DOCUMENTS

| 2013/0172085 A1* | 7/2013 | Harrington | G06Q 50/01 463/42 |
| 2014/0011592 A1* | 1/2014 | Kim | A63F 13/12 463/40 |
| 2014/0039993 A1* | 2/2014 | Kinjo | G07F 17/3244 705/14.12 |
| 2015/0011277 A1* | 1/2015 | Wakeford | A63F 13/00 463/1 |

* cited by examiner

*Primary Examiner* — Jason Yen
(74) *Attorney, Agent, or Firm* — Schwegman Lundberg & Woessner, P.A.

(57) ABSTRACT

A system, a non-transitory machine-readable storage medium storing instructions, and a computer-implemented method to provide efficient game access is described. A request to access a first game using a first primary identifier is received. An internal identifier and a game identifier associated with the first primary identifier are accessed. A request to access a second game using a second primary identifier is received. An internal identifier and a game identifier associated with the second primary identifier are accessed. A determination that the first and second primary identifiers are associated with a particular player is made. An association between the internal identifiers is stored.

20 Claims, 9 Drawing Sheets

SYSTEMS AND METHODS FOR PROVIDING EFFICIENT GAME ACCESS

CROSS-REFERENCE TO RELATED APPLICATIONS

This application claims the priority benefit of U.S. Provisional Application No. 61/973,569, filed Apr. 1, 2014, which is incorporated herein by reference in its entirety.

TECHNICAL FIELD

The present disclosure generally relates to games and applications in general and, in particular embodiments, to computer-implemented multiplayer games, such as online social games hosted on a game server. In an example embodiment, one or more games may be efficiently accessed and loaded.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

DESCRIPTION OF EXAMPLE EMBODIMENTS

In various example embodiments, players of one or more computer-implemented virtual games are provided with efficient game access. In some instances, the one or more computer-implemented virtual games are hosted and provided by a game networking system and accessed through a game account. Moreover, a player logs into the game account using a primary identifier for the player. The primary identifier, in some instances, is associated with an account with a particular provider (e.g. Twitter, Facebook, Google, Zynga, etc.). Alternatively, the primary identifier may be associated with a device that is operated by the player. The game account for a player is created by the game networking system and linked to the primary identifier for the player such that information about the player may be associated with the game account.

However, when a player logs on to a first game through a first primary identifier and a second game through a second primary identifier, it may be difficult to recognize that the two primary identifiers are linked to the same player. For example, a player may log into a first game using the player's Facebook account on Wednesday, may log into a second game using the player's Twitter account on Thursday, and may link the Facebook and Twitter accounts on Friday, such that the player's identities are pieced together as they become known.

To efficiently provide access to games provided by a game networking system, the primary identifiers of the player may be reconciled by mapping the primary identifiers to one or more internal identifiers. In some instances, the internal identifier is associated with the game account used to access one or more computer-implemented virtual games. Each primary identifier may be mapped to an internal identifier associated with a particular game. For example, a player accesses Game A using a first primary identifier and accesses Game B using a second primary identifier. Moreover, both Game A and Game B can be accessed from the same game account. Then, the first primary identifier and the second primary identifier may be mapped to each other through their common mapping to the internal identifier associated with the game account that provides access to both Game A and Game B.

Figure 1:
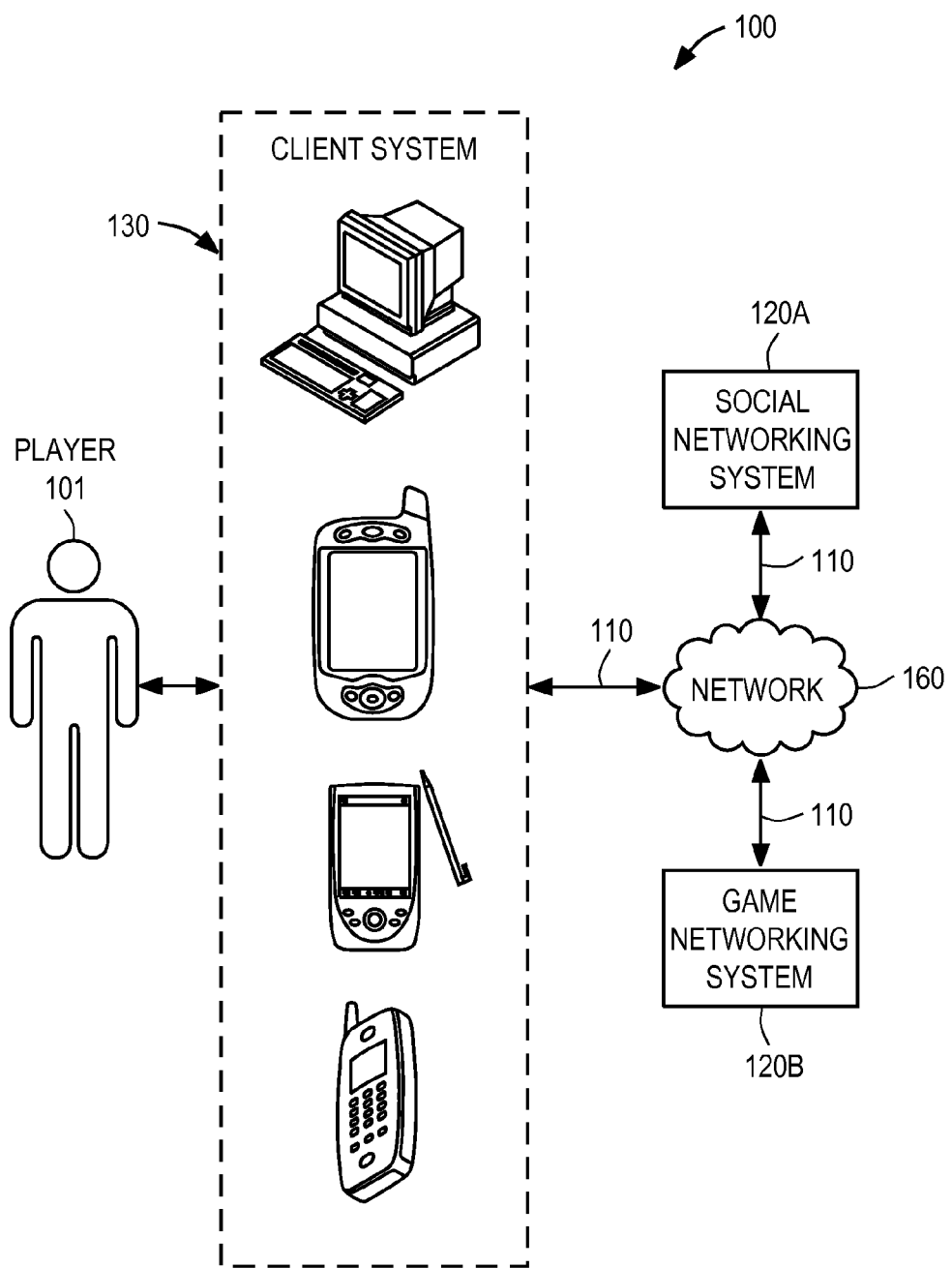
FIG. 1 is a schematic diagram showing an example of a system, according to some example embodiments.

FIG. 1 illustrates an example of a system for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social network system 120a is a network-addressable computing system that can host one or more social graphs.

Social networking system 120a can generate, store, receive, and transmit social networking data. Social network system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accesses by the other components of system 100 either directly or via network 160. Player 101 may use client system 130 to access, send data to, and receive data from social network system 120a and game networking system 120b. Client system 130 can access social networking system 120 or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social network system 120a, game networking system 120b, client system 130, and network 160, this disclosure contemplates any suitable arrangement of player 101, social network system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social network system 120a, game networking system 120b, client system 130, and network 160, this disclosure contemplates any suitable connections between player 101, social network system 120a, game networking system 120b, client system 130, and network 160. As an example and not by way of limitation, in particular embodiments, client system 130 may have a direct connection to social network system 120a or game networking system 120b, bypassing network 160.

Online Games and Game Systems
 Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.
 Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
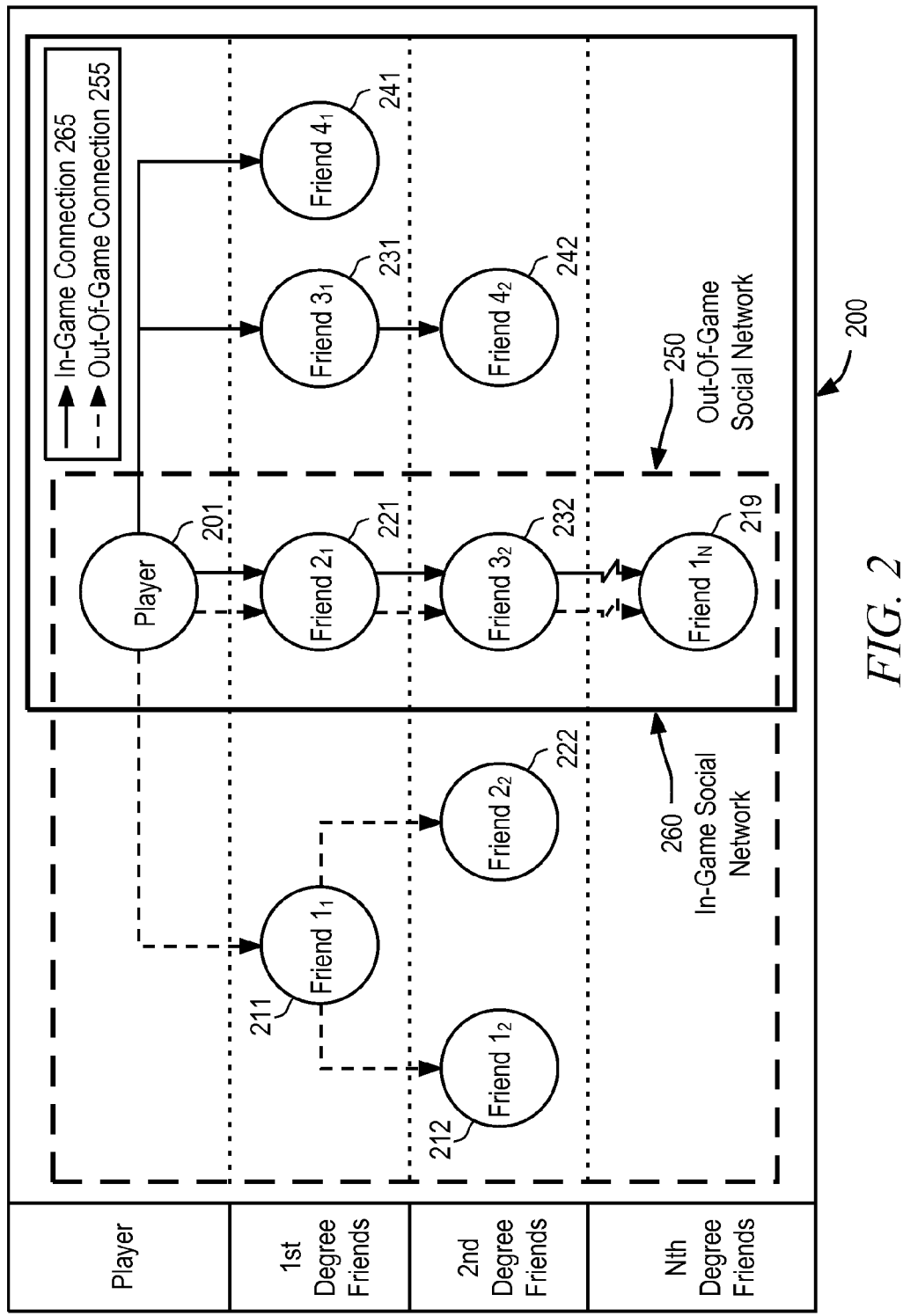
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Efficient Game Access

This section describes various aspects of efficient game access, as implemented by the gaming networking system 120b. It is to be appreciated that the example embodiments described herein are provided merely for illustration and clarity of description. Consequently, the embodiments described here should not be interpreted as limiting the scope of other example embodiments that are consistent with this disclosure.

Figure 3:
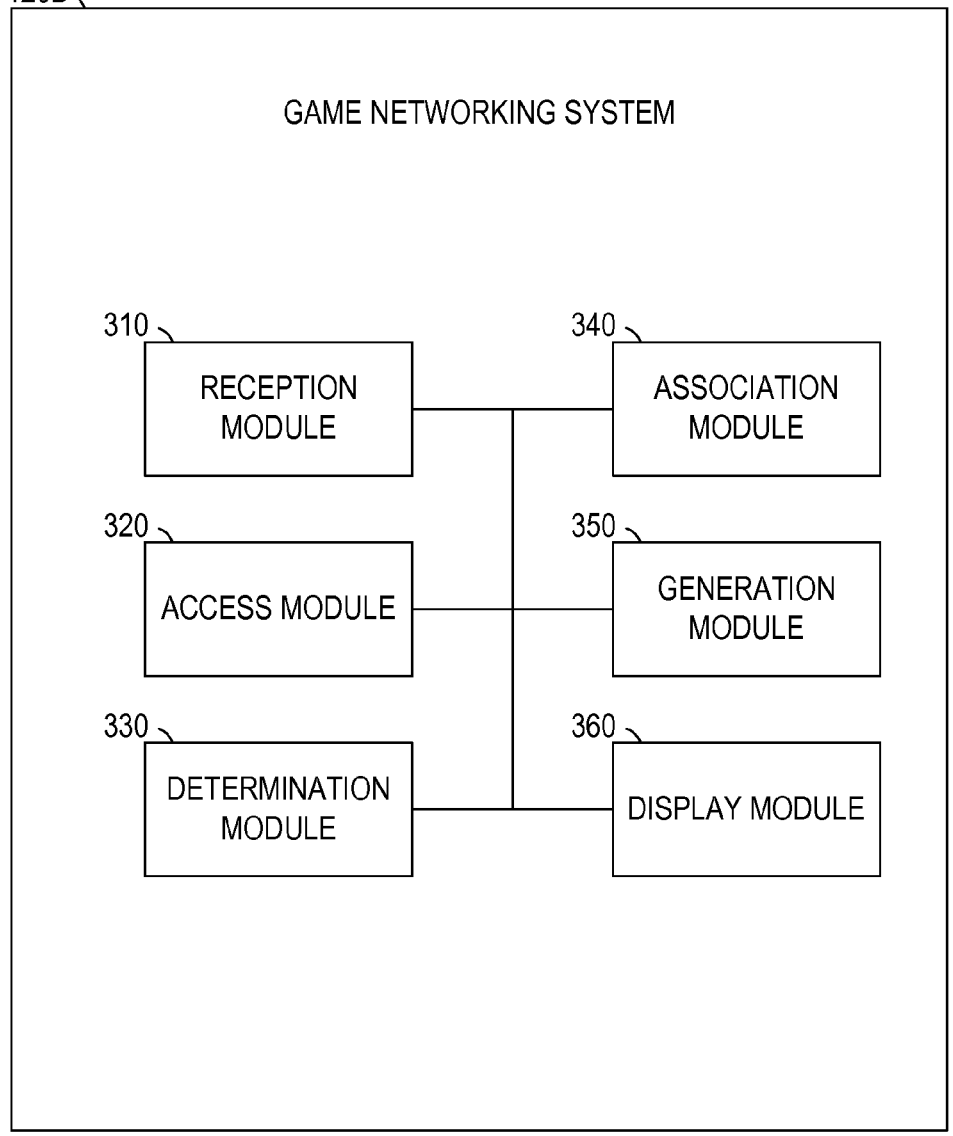
FIG. 3 is a block diagram illustrating components of a game networking system, according to some example embodiments.

FIG. 3 is a block diagram illustrating components of a game networking system, according to some example embodiments. The game networking system 120b may include a reception module 310, an access module 320, a determination module 330, an association module 340, a generation module 350, a display module 360, and a game engine 370.

In various example embodiments, the reception module 310 is configured to receive data from the client device, such as the client system 130 of the player 101 as shown in FIG. 1. In some embodiments, the reception module 310 is configured to receive requests to access one of the multiplayer games available on the game networking system 120b. For instance, the reception module is to receive a request access a game using a primary identifier. Further, the request to access the first game is received from one or more devices operated by a player of the multiplayer game. The primary identifier contains information about the player of the multiplayer game. In some embodiments, the primary identifier is associated with the device of the player that sends the request to the reception module 310. In other such embodiments, the primary identifier is associated with an account of the player with a provider (e.g., Facebook account, Twitter account, and the like). Also, the account of the player includes information that identifies the player to the game networking system 120b, which, in some instances, is incorporated as part of the primary identifier. In various example embodiments, the primary identifier is used to save a game state associated with the multiplayer game.

In some embodiments, the reception module 310 is further configured to receive one or more game states associated with one of the multiplayer games available on the game networking system 120b, as explained below. In further embodiments, the reception module 310 is to detect installation of the multiplayer game on a client device, as further explained below.

In various example embodiments, the access module 320 is configured to access an internal identifier and a game identifier associated with the primary identifier. In various embodiments, the internal identifier is used to access various services related to one or more applications hosted by either the game networking system 120b or the social networking system 120a. For example, the internal identifier is associated with a game account with the game networking system, or the internal identifier is associated with a social networking account with the social networking system. As such, the internal identifier is also used to access one of the multiplayer games available on the game networking system 120b. Moreover, the internal identifier is associated with the primary identifier in that the internal identifier uses the information about the player from the primary identifier to access the multiplayer game for that particular player. The game identifier is also used to identify a specific game on the game networking system 120b. Therefore, in some instances, the game identifier is used in conjunction with the internal identifier to access a game state of a particular game. As such, the access module 320 is further to access the game state of the particular game using the game identifier. In some instances, the internal identifier is associated with more than one primary identifier, as further explained below.

In various example embodiments, the determination module 330 is configured to determine whether one or more primary identifiers are associated with a particular player. A player may use more than one primary identifier to access the multiplayer games available on the game networking system. For instance, the player is able to submit the request to access the first game using the first primary identifier. Additionally, the player is able to submit a request to access a second game using a second primary identifier. Therefore, the determination module 330, in some embodiments, is configured to determine that the first and the second primary identifiers are associated with the same player. For instance, the determination module 330 may identify a match between the player information about the player from the first primary identifier and a match between the player information about the player from the second primary identifier.

In various example embodiments, the determination module 330 is to determine a match between the internal identifier associated with the first primary identifier and the internal identifier associated with the second primary identifier. Since the internal identifier may be associated with more than one primary identifier, in some cases, the internal identifiers are identical. In other words, the internal identifier used by the first primary identifier to access the first game is the same as the internal identifier used by the second primary identifier to access the second game. This may be attributed to the fact that both the first game and the second game are executed on the same application hosted by the game networking system 120b (e.g., Facebook application). Therefore, the internal identifier used to access the application is the same for the first primary identifier and the second primary identifier.

In various example embodiments, the association module 340 is configured to manage and control associations between internal and primary identifiers of a player. For instance, the association module 340 is to store an association between the internal identifier associated with the first primary identifier and an internal identifier associated with the second primary identifier. The stored association between the internal identifiers creates a record that links the internal identifier associated with the first primary identifier with the internal identifier associated with the second primary identifier. In various example embodiments, the association module 340 is further configured to store various game states in a database and associate the stored game states with the primary identifier of the player, as further explained below.

In various example embodiments, the generation module 350 is configured to generate identifiers for a player of the game networking system 120b. For instance, the generation module 350 is configured to generate an internal identifier and a game identifier associated with the player based on the request to access the first game using the first primary identifier. In various example embodiments, the generation module 350 is configured to generate a primary identifier in response to detection of an installation of a multiplayer game on a device of the player, as further explained below.

In various example embodiments, the display module 360 is configured to control information or data that is provided to client systems for display on a device of a player. In some instances, the display module 360 enables selection of a game state on the device. For example, the display module 360 may display an option to select the game state of a particular game hosted by the game networking system 120b. As such, the display module 360 is further to cause display of a game state on a screen of the device in response to selection of the game state.

Figure 4:
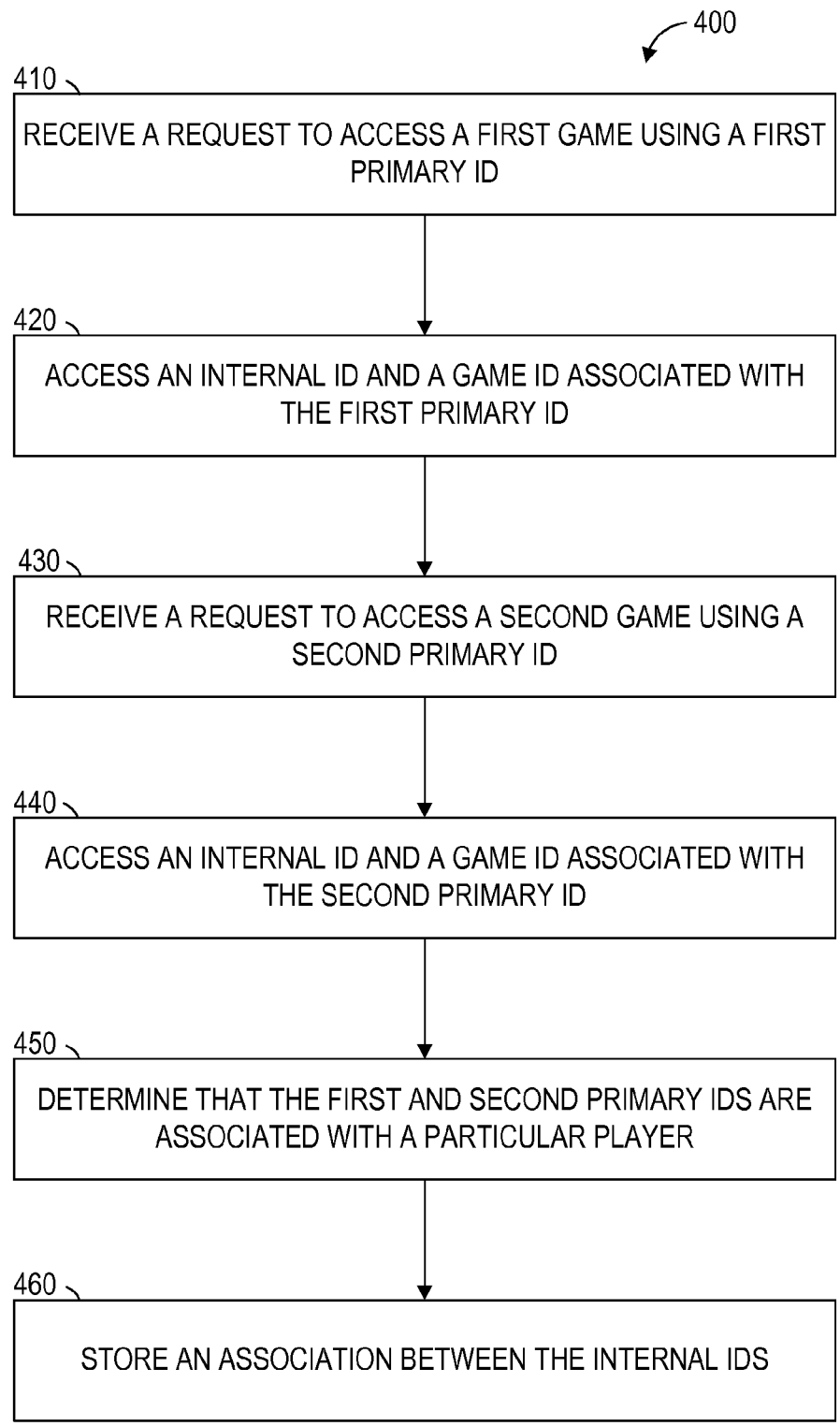
FIGS. 4-6 are flowcharts illustrating an example method of providing efficient game access to a player, according to some example embodiments.

FIG. 4 is a flowchart illustrating an example method 400 of providing efficient game access to a player, according to some example embodiments. As shown in FIG. 4, the method includes operations 410, 420, 430, 440, 450, and 460.

At operation 410, the reception module 310 receives a request to access a first game using a first primary identifier. In some instances, the reception module 310 receives the request to access the first game from a first device operated by a player. Moreover, the first primary identifier is associated with the first device operated by the player. In other words, a record that links the first primary identifier with the first device operated by the player is stored in a database.

At operation 420, the access module 320 accesses an internal identifier and a game identifier associated with the first primary identifier. The internal identifier may be used to access various services related to one or more applications, such as an online game available on the game networking system 120b. Also, the game identifier is used to identify the first game that is to be accessed. Accordingly, as part of the operation 420, the access module 320 is further to access a game state of the first game using the internal identifier and the game identifier.

At operation 430, the reception module 310 receives a request to access a second game using a second primary identifier. In some instances, the reception module 310 receives the request to access the second game from a device operated by a player. Also, the device may be the same device that sent the request to access the first game in operation 410. Alternatively, the device may be a second device separate from the first device that sent the request to access the first game. In either event, a record that links the first primary identifier with the device operated by the player is stored in a database.

At operation 440, the access module 320 accesses an internal identifier and a game identifier associated with the second primary identifier. As part of the operation 440, the access module 320 is further to access a game state of the second game using the internal identifier and the game identifier. In some instances, the internal identifier is the same as the internal identifier associated with the first primary identifier.

At operation 450, the determination module 330 determines that the first and the second primary identifiers are associated with a particular player. To accomplish this, the determination module 330 identifies a match between the player information about the player from the first primary identifier and a match between the player information about the player from the second primary identifier. In other such embodiments, the determination module 330 determines a match between the internal identifier associated with the first primary identifier and the internal identifier associated with the second primary identifier. Alternatively, as part of the operation 450, the determination module 330 causes display, on a device operated by the player, of an option to confirm that both the first and the second primary identifiers are associated with the player. Moreover, determination module 330 may receive an indication, from the device operated by the player, that the first and the second primary identifiers are associated with the particular player.

At operation 460, the association module 340 stores an association between the internal identifier associated with the first primary identifier and the internal identifier associated with the second primary identifier. The association between the internal identifiers may be stored by the association module 340 in a database. Moreover, the stored association can be used to reference the fact that the first primary identifier and the second primary identifier are associated with the same player.

Figure 5:
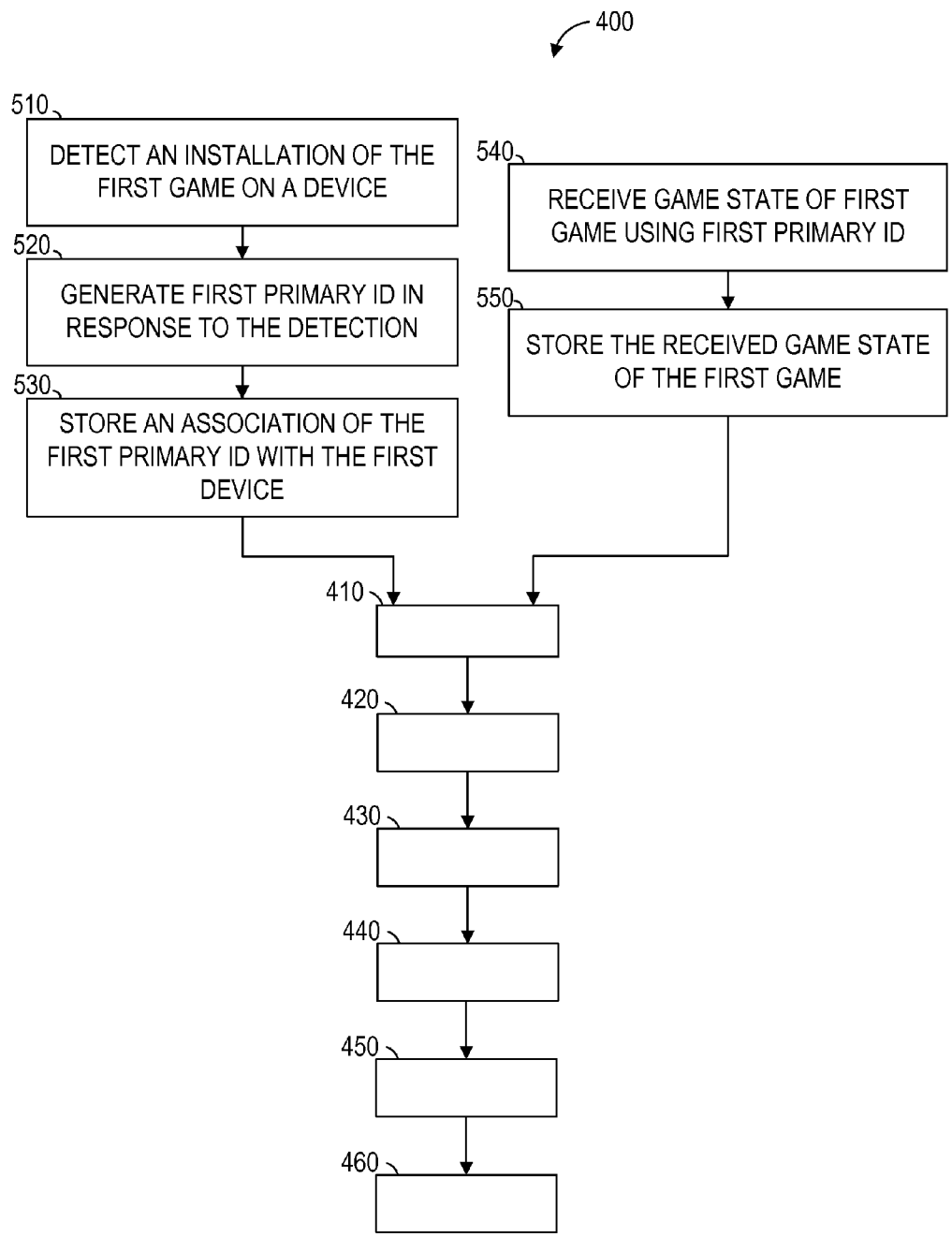

As shown in FIG. 5, the method 400 may include operations 510, 520, 530, 540, and 550. Moreover, the operations 510, 520, 530, may each be performed prior to the operation 410. Likewise, the operations 540 and 550 may each be performed prior to the operation 410.

At operation 510, the reception module 310 detects installation of the first game on a device operated by the player. For example, the player operating the device may download a client component the first game onto the device, which sends a request to the game networking system 120*b* and is detected by the reception module 310.

At operation 520, the generation module 350 generates a first primary identifier in response to the detection of the first game on the first device.

At operation 530, the association module 340 stores an association of the first primary identifier with the first device. In some instances, the association of the first primary identifier with the first device is a file that links the first primary identifier with the first device.

At operation 540, the reception module 310 receives a game state of the first game using the first primary identifier. As stated earlier, the first primary identifier is used to save the game state of the first game. Therefore, the receiving of the game state of the first game involves the first primary identifier. In some instances, the game state of the first game is received from a device of the player that is associated with or that is linked to the first primary identifier.

At operation 550, the association module 340 stores the received game state of the first game in a database. Moreover, the association module 340 is further to associate the received game state of the first game with the first primary identifier. This may include generating a file that links the received game state of the first game with the first primary identifier.

Figure 6:
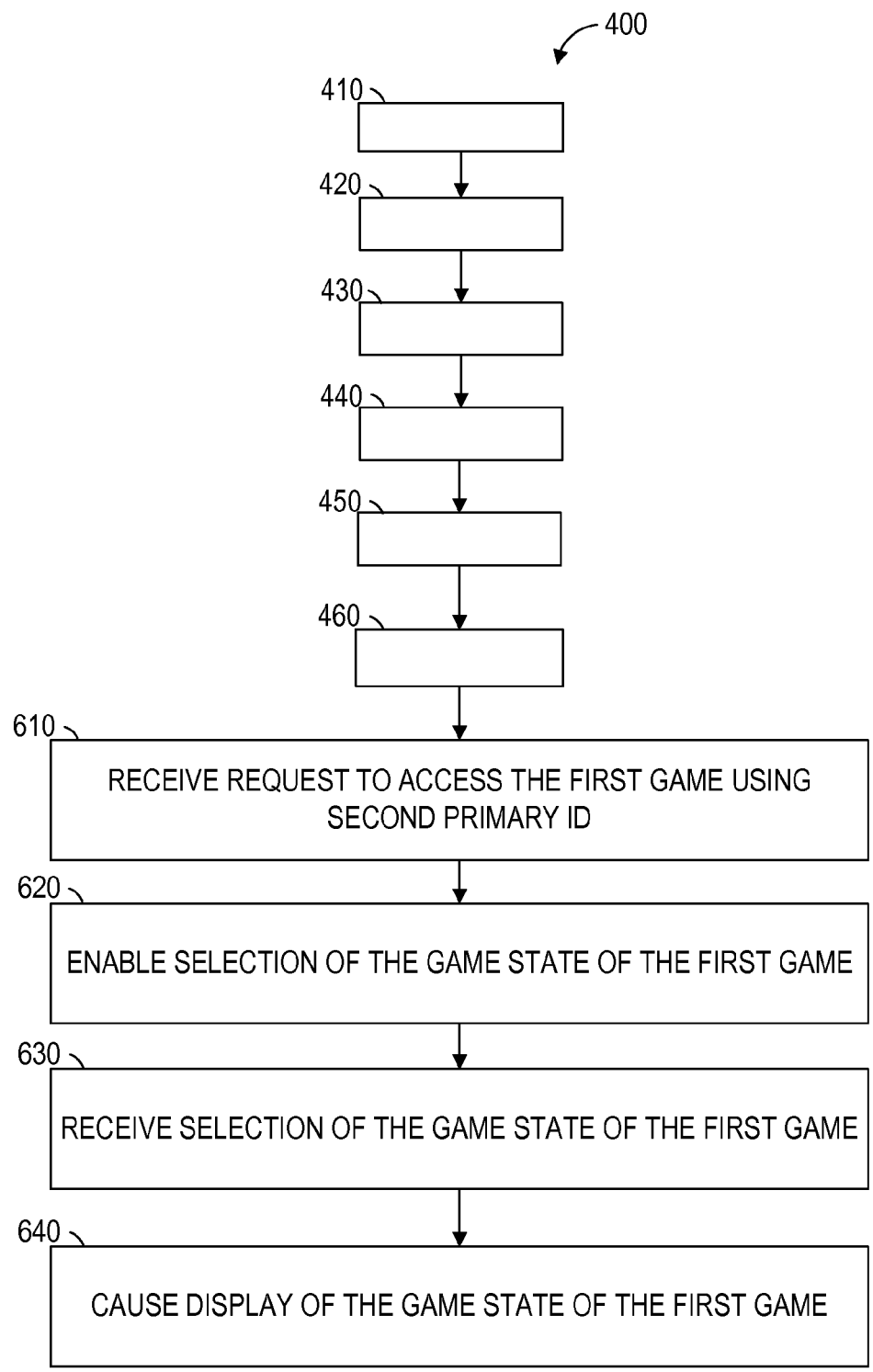

As shown in FIG. 6, the method 400 may include operations 610, 620, 630, and 640. Each of the operations 610, 620, 630, and 640 may be performed after the operation 460.

At operation 610, the reception module 310 receives a request to access the first game using the second primary identifier. In some instances, the second primary identifier is associated with or received from a device operated by the player, and that device is not associated with the first primary identifier. Alternatively, the second primary identifier is linked to an account of the player, and that account is not linked with the first primary identifier.

At operation 620, the display module 360 enables selection of the game state of the first game. In various embodiments, the game state of the first game is associated with the first primary identifier. Therefore, the first primary identifier is normally used to retrieve the game state of the first game. However, access to the game state through the second primary identifier is enabled based on the determination that the second primary identifier is associated with the same player associated with the first primary identifier. Therefore, the display module 360 is further to enable selection of the game state of the first game based on the determination that the first and second primary identifiers are associated with the player. In this regard, the display module 360 may cause display of an option that allows the player to select the game state of the first game. Further, the display module 360 may cause display of an image that depicts the game state of the first game.

In further embodiments, the second primary identifier is associated with a further game state of the first game. For example, the first game may also be installed on a second device of the player, and that device may be linked to the second primary identifier of the player. As such, the display module 360 is further to enable selection between the game state of the first game and the further game state of the first game. In this regard, the display module 360 may cause display of an option that allows the player to select between the game state of the first game and the further game state of the first game.

At operation 630, the reception module 310 receives a selection of the game state of the first game. The selection of the game state of the first game may be received from the device operated by the player.

At operation 640, the display module 360 causes display of the game state of the first game. The game state of the first game may be displayed on the device operated by the player.

Figure 7:
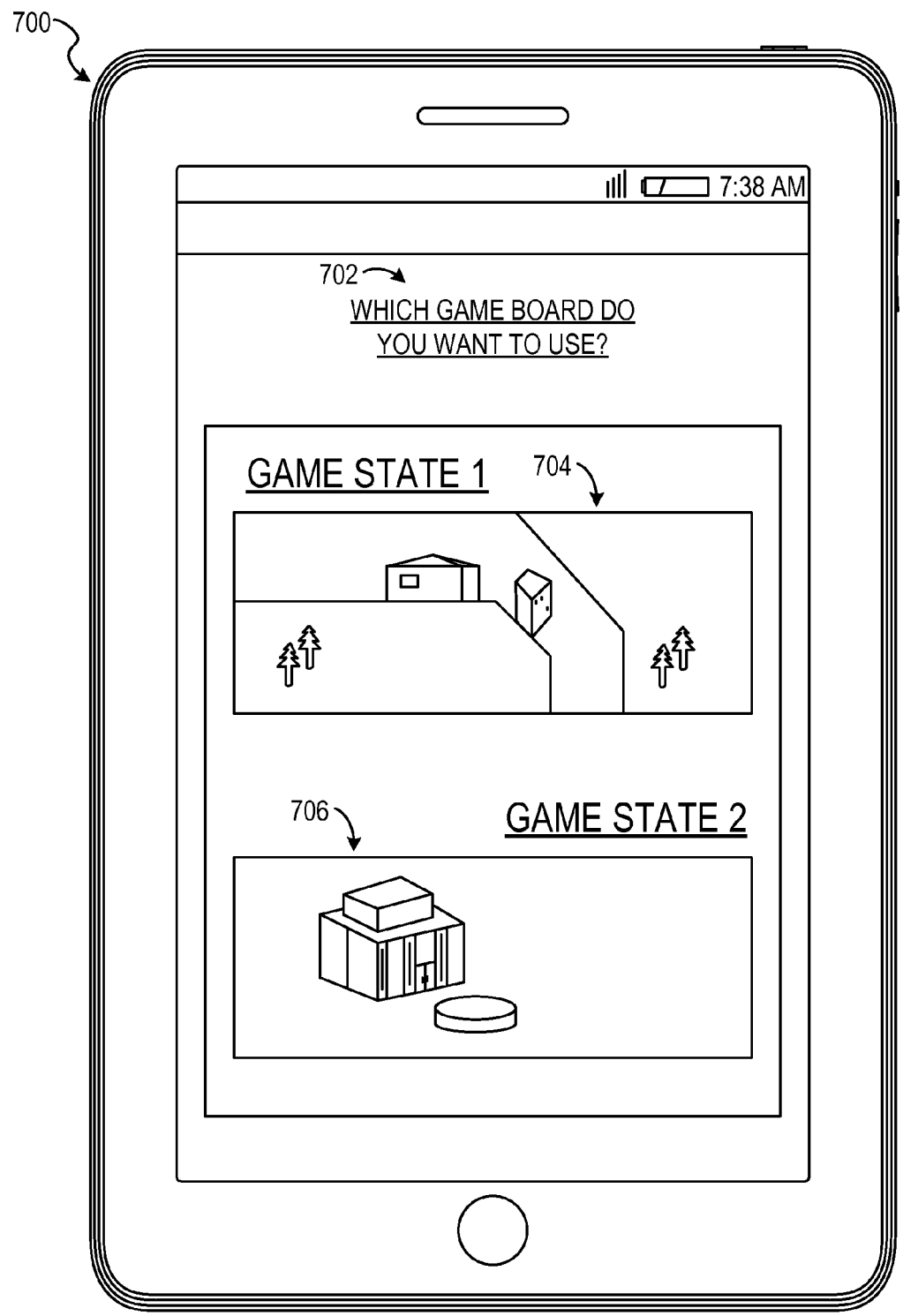
FIG. 7 is a diagram that depicts an example user interface, according to some example embodiments.

FIG. 7 is a diagram that depicts an example user interface, according to some example embodiments. The example user interface may be displayed on a device that is operated by a player of the multiplayer game. As shown, FIG. 7 includes a description 702, a depiction of a first game state 704, and a depiction of a second game state 706. The description 702 may prompt the user to select either the depiction of the first game state 704 or the depiction of the second game state 706. The first game state and the second game state may both be for the same multiplayer game. Further, the user interface may be presented by the display module 360 as a result of determining that the second primary identifier is associated with the same player associated with the first primary identifier.

Data Flow

Figure 8:
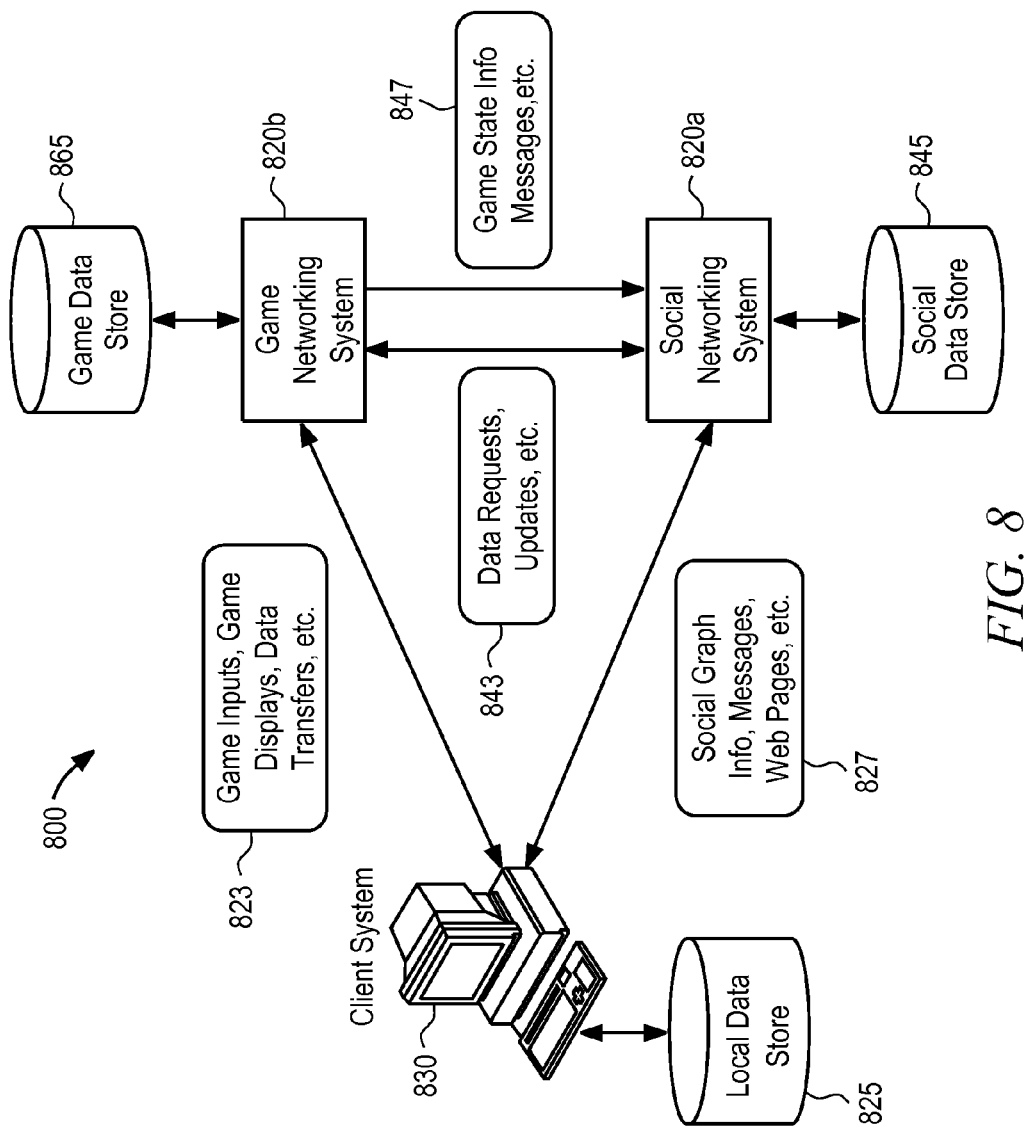
FIG. 8 is a diagrammatic representation of an example data flow between example components of the example system of FIG. 1, according to some example embodiments.

FIG. 8 illustrates an example data flow between the components of system 800. In particular embodiments, system 800 can include client system 830, social networking system 820a, and game networking system 820b. The components of system 800 can be connected to each other in any suitable configuration, using any suitable type of connection. The components may be connected directly or over any suitable network. Client system 830, social networking system 820a, and game networking system 820b can each have one or more corresponding data stores such as local data store 825, social data store 845, and game data store 865, respectively. Social networking system 820a and game networking system 820b can also have one or more servers that can communicate with client system 830 over an appropriate network. Social networking system 820a and game networking system 820b can have, for example, one or more internet servers for communicating with client system 830 via the Internet. Similarly, social networking system 820a and game networking system 820b can have one or more mobile servers for communicating with client system 830 via a mobile network (e.g., GSM, PCS, Wi-Fi, WPAN, etc.). In some embodiments, one server may be able to communicate with client system 830 over both the Internet and a mobile network. In other embodiments, separate servers can be used.

Client system 830 can receive and transmit data 823 to and from game networking system 820b. This data can include, for example, webpages, messages, game inputs, game displays, HTTP packets, data requests, transaction information, updates, and other suitable data. At some other time, or at the same time, game networking system 820b can communicate data 843, 847 (e.g., game state information, game system account information, page info, messages, data requests, updates, etc.) with other networking systems, such as social networking system 820a (e.g., Facebook, Myspace, etc.). Client system 830 can also receive and transmit data 827 to and from social networking system 820a. This data can include, for example, webpages, messages, social graph information, social network displays, HTTP packets, data requests, transaction information, updates, and other suitable data.

Communication between client system 830, social networking system 820a, and game networking system 820b can occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 820b, the BLOB containing the game state for the instance corresponding to the player can be transmitted to client system 830 for use by a client-side executed object to process. In particular embodiments, the client-side executable may be a FLASH-based game, which can de-serialize the game state data in the BLOB. As a player plays the game, the game logic implemented at client system 830 maintains and modifies the various game state parameters locally. The client-side game logic may also batch game events, such as mouse clicks, and transmit these events to game networking system 820b. Game networking system 820b may itself operate by retrieving a copy of the BLOB from a database or an intermediate memory cache (memcache) layer. Game networking system 820b can also de-serialize the BLOB to resolve the game state parameters and execute its own game logic based on the events in the batch file of events transmitted by the client to synchronize the game state on the server side. Game networking system 820b may then re-serialize the game state, now modified, into a BLOB and pass this to a memory cache layer for lazy updates to a persistent database.

With a client-server environment in which the online games may run, one server system, such as game networking system 820b, may support multiple client systems 830. At any given time, there may be multiple players at multiple client systems 830 all playing the same online game. In practice, the number of players playing the same game at the same time may be very large. As the game progresses with each player, multiple players may provide different inputs to the online game at their respective client systems 830, and multiple client systems 830 may transmit multiple player inputs and/or game events to game networking system 820b for further processing. In addition, multiple client systems 830 may transmit other types of application data to game networking system 820b.

In particular embodiments, a computed-implemented game may be a text-based or turn-based game implemented as a series of web pages that are generated after a player selects one or more actions to perform. The web pages may be displayed in a browser client executed on client system 830. As an example and not by way of limitation, a client application downloaded to client system 830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 820a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 830, either caused by an action of a game player or by the game logic itself, client system 830 may need to inform game networking system 820b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 800 is discussed in reference to updating a multi-player online game hosted on a network-addressable system (such as, for example, social networking system 820a or game networking system 820b), where an instance of the online game is executed remotely on a client system 830, which then transmits application event data to the hosting system such that the remote game server synchronizes game state associated with the instance executed by the client system 830.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 830 may include a Flash client. The Flash client may be configured to receive and run Flash application or game object code from any suitable networking system (such as, for example, social networking system 820a or game networking system 820b). In particular embodiments, the Flash client may be run in a browser client executed on client system 830. A player can interact with Flash objects using client system 830 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 830, the Flash client may send the events that caused the game state changes to the in-game object to game networking system 820b. However, to expedite the processing and hence the speed of the overall gaming experience, the Flash client may collect a batch of some number of events or updates into a batch file. The number of events or updates may be determined by the Flash client dynamically or determined by game networking system 820b based on server loads or other factors. For example, client system 830 may send a batch file to game networking system 820b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 830. In particular embodiments, the batch file may be a text file and the name-value pairs may be in string format.

In particular embodiments, when a player plays an online game on client system 830, game networking system 820b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 820b may retrieve the corresponding BLOB from the database to determine the most-recent values of the game-related data. In particular embodiments, while a player is playing the online game, game networking system 820b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 9:
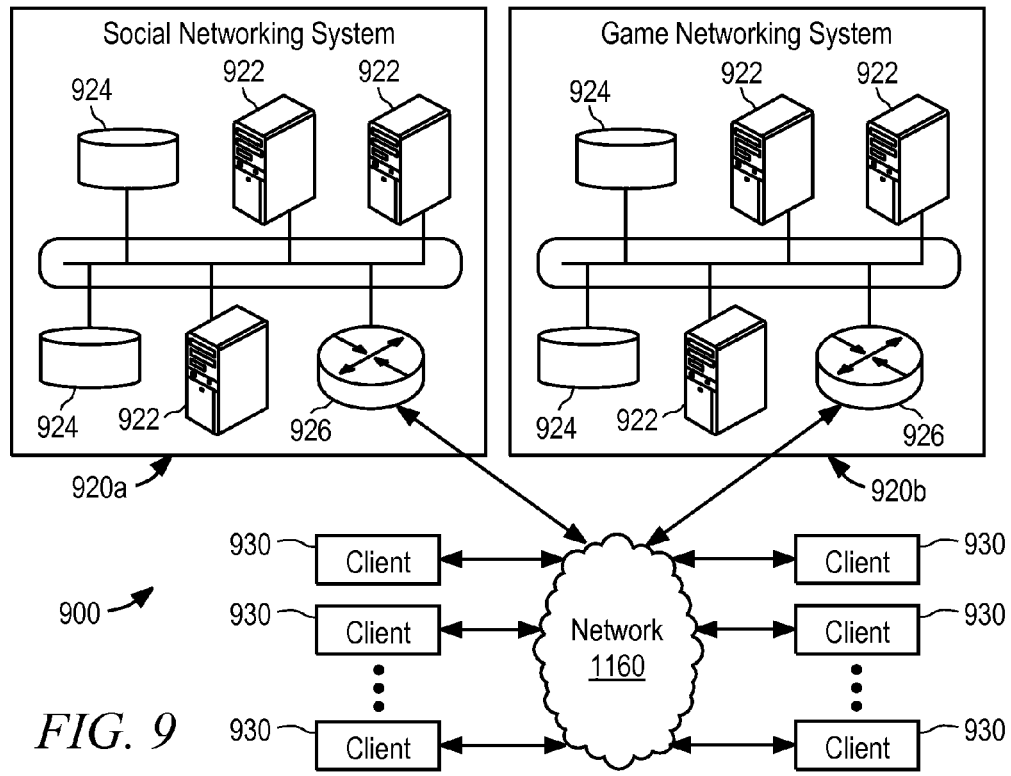
FIGS. 9-10 are schematic diagrams showing an example network environment, in which various example embodiments may operate, according to some example embodiments.

Particular embodiments may operate in a wide area network environment, such as the Internet, including multiple network addressable systems. FIG. 9 illustrates an example network environment, in which various example embodiments may operate. Network cloud 960 generally represents one or more interconnected networks, over which the systems and hosts described herein can communicate. Network cloud 960 may include packet-based wide area networks (such as the Internet), private networks, wireless networks, satellite networks, cellular networks, paging networks, and the like. As FIG. 9 illustrates, particular embodiments may operate in a network environment comprising one or more networking systems, such as social networking system 920a, game networking system 920b, and one or more client systems 930. The components of social networking system 920a and game networking system 920b operate analogously; as such, hereinafter they may be referred to simply at networking system 920. Client systems 930 are operably connected to the network environment via a network service provider, a wireless carrier, or any other suitable means.

Networking system 920 is a network addressable system that, in various example embodiments, comprises one or more physical servers 922 and data stores 924. The one or more physical servers 922 are operably connected to computer network 960 via, by way of example, a set of routers and/or networking switches 926. In an example embodiment, the functionality hosted by the one or more physical servers 922 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 922 may host functionality directed to the operations of networking system 920. Hereinafter servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 924 corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In particular embodiments, data store 924 may be implemented by any suitable physical system(s) including components, such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 930 to enter addresses of specific network resources to be retrieved, such as resources hosted by networking system 920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as target structured document) hosted by networking system 920, the user's web browser, or other document rendering engine or suitable client application, formulates and transmits a request to networking system 920. The request generally includes a URL or other document identifier as well as metadata or other information. By way of example, the request may include information identifying the user, such as a user ID, as well as information identifying or characterizing the web browser or operating system running on the user's client computing device 930. The request may also include location information identifying a geographic location of the user's client system or a logical network location of the user's client system. The request may also include a timestamp identifying when the request was transmitted.

Although the example network environment described above and illustrated in FIG. 9 described with respect to social networking system 920a and game networking system 920b, this disclosure encompasses any suitable network environment using any suitable systems. As an example and not by way of limitation, the network environment may include online media systems, online reviewing systems, online search engines, online advertising systems, or any combination of two or more such systems.

Figure 10:
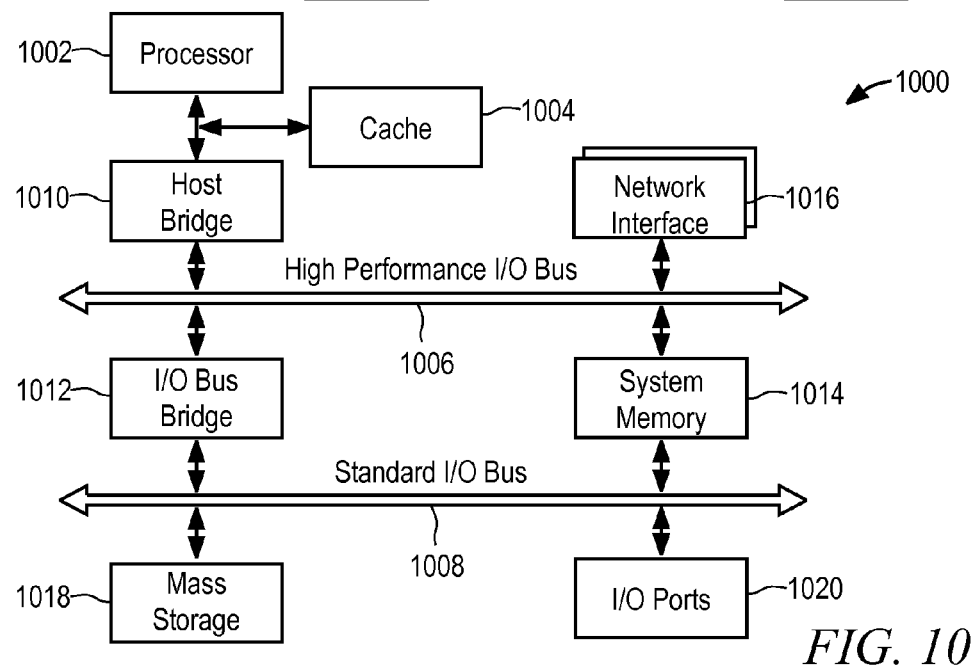

FIG. 10 illustrates an example computing system architecture, which may be used to implement a server 922 or a client system 930. In one embodiment, hardware system 1000 comprises a processor 1002, a cache memory 1004, and one or more executable modules and drivers, stored on a tangible computer readable medium, directed to the functions described herein. Additionally, hardware system 1000 may include a high performance input/output (I/O) bus 1006 and a standard I/O bus 1008. A host bridge 1010 may couple processor 1002 to high performance I/O bus 1006, whereas I/O bus bridge 1012 couples the two buses 1006 and 1008 to each other. A system memory 1014 and one or more network/communication interfaces 1016 may couple to bus 1006. Hardware system 1000 may further include video memory (not shown) and a display device coupled to the video memory. Mass storage 1018 and I/O ports 1020 may couple to bus 1008. Hardware system 1000 may optionally include a keyboard, a pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail below. In particular, network interface 1016 provides communication between hardware system 1000 and any of a wide range of networks, such as an Ethernet (e.g., IEEE 802.3) network, a backplane, etc. Mass storage 1018 provides permanent storage for the data and programming instructions to perform the above-described functions implemented in servers 422, whereas system memory 1014 (e.g., DRAM) provides temporary storage for the data and programming instructions when executed by processor 1002. I/O ports 1020 are one or more serial and/or parallel communication ports that provide communication between additional peripheral devices, which may be coupled to hardware system 1000.

Hardware system 1000 may include a variety of system architectures and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present disclosure may not require nor include all of the above components. For example, the peripheral devices shown coupled to standard I/O bus 1008 may couple to high performance I/O bus 1006. In addition, in some embodiments, only a single bus may exist, with the components of hardware system 1000 being coupled to the single bus. Furthermore, hardware system 1000 may include additional components, such as additional processors, storage devices, or memories.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
receiving a request to access a first game using a first primary identifier;
accessing an internal identifier and a game identifier associated with the first primary identifier and accessing a related game state for the first game;
receiving a request to access a second game using a second primary identifier;
accessing an internal identifier and a game identifier associated with the second primary identifier and accessing a related game state for the second game, the first primary identifier being different from the second primary identifier and the first game being different from the second game;
determining, using one or more processors, that the first and the second primary identifiers are associated with a particular player;
storing an association between the internal identifier associated with the first primary identifier and the internal identifier associated with the second primary identifier;
receiving a request to access the first game using the second primary identifier; and
enabling selection of the game state of the first game associated with the first primary identifier based on the determination that the first and second primary identifiers are associated with the particular player.

2. The method of claim 1, wherein the game state of the first game is associated with the first primary identifier.

3. The method of claim 2, further comprising:
receiving a selection of the game state of the first game associated with the first primary identifier; and
causing display of the game state of the first game associated with the first primary identifier.

4. The method of claim 1, further comprising:
generating the internal identifier and the game identifier associated with the first primary identifier based on the request to access the first game using the first primary identifier.

5. The method of claim 1, wherein the determining that the first and the second primary identifiers are associated with the particular player includes determining a match between the internal identifier associated with the first primary identifier and the internal identifier associated with the second primary identifier.

6. The method of claim 1, wherein both the request to access the first game and the request to access the second game are received from a device operated by the particular player.

7. The method of claim 6, wherein the determining that the first and the second primary identifiers are associated with the particular player includes:
causing display, on the device operated by the particular player, of an option to confirm that the first and the second primary identifiers are associated with the particular player; and
receiving an indication from the device that the first and the second primary identifiers are associated with the particular player.

8. The method of claim 1, further comprising:
detecting an installation of the first game on a device of the particular player;
generating the first primary identifier in response to the detection; and
storing an association of the first primary identifier with the first device of the particular player, wherein the receiving the request to access the first game is received from the first device of the particular player.

9. The method of claim 1, further comprising:
receiving a game state of the first game using the first primary identifier; and
storing the received game state of the first game in a database and associating the received game state of the first game with the first primary identifier.

10. The method of claim 1, wherein the primary identifier is associated with an account that identifies the player.

11. A system comprising:
a reception module configured to:
receive a request to access a first game using a first primary identifier, and receive a request to access a second game using a second primary identifier;
an access module configured to:
access an internal identifier and a game identifier associated with the first primary identifier, access a related game state for the first game, access an internal identifier and a game identifier associated with the second primary identifier, and access a related game state for the second game, the first primary identifier being different from the second primary identifier and the first game being different from the second game;
a determination module configured to determine that the first and the second primary identifiers are associated with a particular player;
an association module configured to store an association between the internal identifier associated with the first primary identifier and the internal identifier associated with the second primary identifier, the reception module further configured to receive a request to access the first game using the second primary identifier; and
a display module configured to enable selection of the game state of the first game associated with the first primary identifier based on the determination that the first and second primary identifiers are associated with the particular player.

12. The system of claim 11, wherein the game state of the first game is associated with the first primary identifier.

13. The system of claim 12, wherein the reception module is further configured to receive a selection of the game state of the first game associated with the first primary identifier, and wherein the display module is further configured to cause display of the game state of the first game associated with the first primary identifier.

14. The system of claim 11, further comprising a generation module configured to generate the internal identifier and the game identifier associated with the first primary identifier based on the request to access the first game using the first primary identifier.

15. The system of claim 11, wherein the determination module is further configured to determine a match between the internal identifier associated with the first primary identifier and the internal identifier associated with the second primary identifier.

16. The system of claim 11, wherein both the request to access the first game and the request to access the second game are received from a device operated by the particular player.

17. The system of claim 16, wherein determination module is further configured to:
cause display, on the device operated by the particular player, of an option to confirm that the first and the second primary identifiers are associated with the particular player, and receive an indication from the device that the first and the second primary identifiers are associated with the particular player.

18. The system of claim 11, wherein reception module is further configured to detect an installation of the first game on a device of the particular player, wherein the generation module is further configured to generate the first primary identifier in response to the detection, and wherein the association module is further configured to store an association of the first primary identifier with the first device of the particular player.

19. The system of claim 11, wherein the reception module is further configured to receive a game state of the first game using the first primary identifier, and wherein the association module is further configured to store the received game state of the first game in a database, and associate the received game state of the first game with the first primary identifier.

20. A non-transitory machine-readable medium storing instructions that, when executed by one or more processors of a machine, cause the machine to perform operations comprising:

receiving a request to access a first game using a first primary identifier;

accessing an internal identifier and a game identifier associated with the first primary identifier and accessing a related game state for the first game;

receiving a request to access a second game using a second primary identifier;

accessing an internal identifier and a game identifier associated with the second primary identifier and accessing a related game state for the second game, the first primary identifier being different from the second primary identifier and the first game being different from the second game;

determining that the first and the second primary identifiers are associated with a particular player;

storing an association between the internal identifier associated with the first primary identifier and the internal identifier associated with the second primary identifier;

receiving a request to access the first game using the second primary identifier; and enabling selection of the game state of the first game associated with the first primary identifier based on the determination that the first and second primary identifiers are associated with the particular player.

* * * * *